United States Patent

Kiffe

[11] Patent Number: 5,161,635
[45] Date of Patent: Nov. 10, 1992

[54] MOTORIZED GOLF CADDIE

[76] Inventor: Horst-Gregor Kiffe, Vogelbeerweg 19, 7730 Villingen-Schwenningen, Fed. Rep. of Germany

[21] Appl. No.: 668,200

[22] Filed: Mar. 12, 1991

[30] Foreign Application Priority Data

Mar. 21, 1990 [DE] Fed. Rep. of Germany ....... 4009015

[51] Int. Cl.$^5$ .............................. B62D 51/04
[52] U.S. Cl. ................... 180/193; 180/216; 180/907; 280/DIG. 5; 280/DIG. 6; 188/24.16
[58] Field of Search ....... 180/19.1, 19.3, 6.28, 180/216, 907; 280/DIG. 5, DIG. 6; 188/2 D, 24.11, 24.16, 77 R

[56] References Cited

U.S. PATENT DOCUMENTS

| 3,648,795 | 3/1972 | Moulton | 180/216 |
| 3,731,756 | 5/1973 | Hajec | 280/DIG. 5 X |
| 3,896,893 | 7/1975 | Willis et al. | 180/19.1 |
| 4,081,047 | 3/1978 | Lovell et al. | 280/DIG. 5 X |
| 4,142,732 | 3/1979 | Boyd | 188/77 R X |
| 4,538,969 | 9/1985 | Carter | 280/DIG. 5 X |
| 4,573,549 | 3/1986 | Pankow | 280/DIG. 5 X |
| 4,615,406 | 10/1986 | Bottenschein et al. | 180/19.1 |
| 4,657,100 | 4/1987 | Lewis | 180/19.1 |
| 4,819,767 | 4/1989 | Laird | 188/2 D |
| 4,832,362 | 5/1989 | Chen | 280/DIG. 6 X |
| 4,848,504 | 7/1989 | Olson | 180/19.1 |
| 4,974,693 | 12/1990 | Nakai et al. | 280/DIG. 5 X |

FOREIGN PATENT DOCUMENTS

| 1313746 | 4/1973 | United Kingdom | 280/DIG. 5 |
| 2127364 | 4/1984 | United Kingdom | 280/DIG. 5 |
| 2196591 | 5/1988 | United Kingdom | 280/DIG. 5 |

Primary Examiner—Charles A. Marmor
Assistant Examiner—Kevin Hurley
Attorney, Agent, or Firm—Lackenbach Siegel Marzullo & Aronson

[57] ABSTRACT

The invention relates to an three-wheel electromotor-driven golf caddie. Two rear wheels (3), driven by an electric motor (18) via a drive transmission (11) are furnished at the cart frame. The front wheel (13) is supported at a wheel fork, which is offset rearwardly and which is rotary supported at a rotary bearing. A brake device is furnished for the two rear wheels (3), where the brake device is preferably actuated with a brake lever (17) via a Bowden cable (8).

14 Claims, 9 Drawing Sheets

MOTORIZED GOLF CADDIE

The Invention relates to a golf caddie.

Preferably, electrically driven carts (golf caddies) are employed for the transport of golf bags filled with different golf clubs carried along during a golf game because of the relatively large weight of the golf bags.

A three-wheel golf caddie with a front wheel and two electrically driven rear wheels is known from the German Petit Patent DE-GB 84 26 522 U1. Since the front wheel is supported in this case in a fixed wheel fork, the front wheel of the caddie has to be lifted off the ground for steering which is cumbersome for the user and requires additionally the use of force.

A caddie is known from the German Petit Patent DE-GB 86 19 830 U1, where a single following caster wheel is supported in a rotatable wheel fork. According to this embodiment, the caddie has to pass over ground unevenesses or, respectively thresholds, and curbs with its two driven wheels, which has proven to be disadvantageous in the handling of the caddie.

The two preceding embodiments are furthermore problematic for moving and driving along slopes because of the lacking braking device.

The invention intends to create a golf caddie which is driven in front of the user, which is easily steerable, and which is also suitable for driving on slopes and for driving over thresholds, curbs, rises, and sills without problems.

A golf-caddie according to the invention is particularly well steerable based on a rearwardly offset, rotatable wheel fork of the front wheel and is suitable for driving on slops because of a braking device acting on the two rear wheels.

According to an advantageous embodiment, the wheel fork includes a caster, a camber, whereby the front wheel resets itself substantially automatically to a straight forward running direction.

The battery furnished for the drive is preferably disposed near the center of gravity of the vehicle frame, which results in a further improvement of the drive properties.

A further positive effect on the drive properties of the caddie is a substantially torsion-resistant construction of the vehicle frame. This can be achieved by connecting the front and the rear frame parts, which are preferably made by pressure die-casting, via stable braces.

According to a preferred embodiment, the rear frame part surrounds the drive unit, including electromotor, drive, and electronic steering device, as well as the braking device and the rear axle, all of which are thereby protected against soiling and damage. Furthermore, good noise insulation is ensured by this construction.

Preferably, a Bowden cable, actuable via a braking lever, is furnished for actuating the braking device. Said braking device actuates the two rear wheel brakes simultaneously such that a uniform brake pressure acts on the two rear wheels independent of the brake wear.

According to a further preferred embodiment, the golf caddie can be folded and/or collapsed for easy transport. Two carrying handles facilitate a loading of the golf caddie into the trunk space of an automobile.

The invention is illustrated in more detail in the following by way of a particularly preferred embodiment, which is illustrated in the drawings. The drawings show in FIG. 1, a perspective view of a golf caddie according to the invention, FIG. 2, a side view of the caddie according to FIG. 1, without golf bag and without battery, FIG. 3, an enlarged side view of the caddie according to FIG. 2, in a folded state, FIG. 4, a top plan view of the caddie according to FIG. 1, without golf bag, FIG. 5, an enlarged side view of the cart frame according to FIG. 3, FIG. 6, an enlarged side view according to FIG. 5, of a variant of the cart frame, FIG. 7, an enlarged section through the rear axle of the caddie according to FIG. 1, FIG. 8, a section according t the section of FIG. 7, through the rear axle of the caddie according to a second embodiment, FIG. 9, a partial bottom view of the caddie according to FIG. 8, as seen in the direction IX, and FIG. 10, a partial, in part a sectional view in the direction X—X according to FIG. 8.

Figure 1:
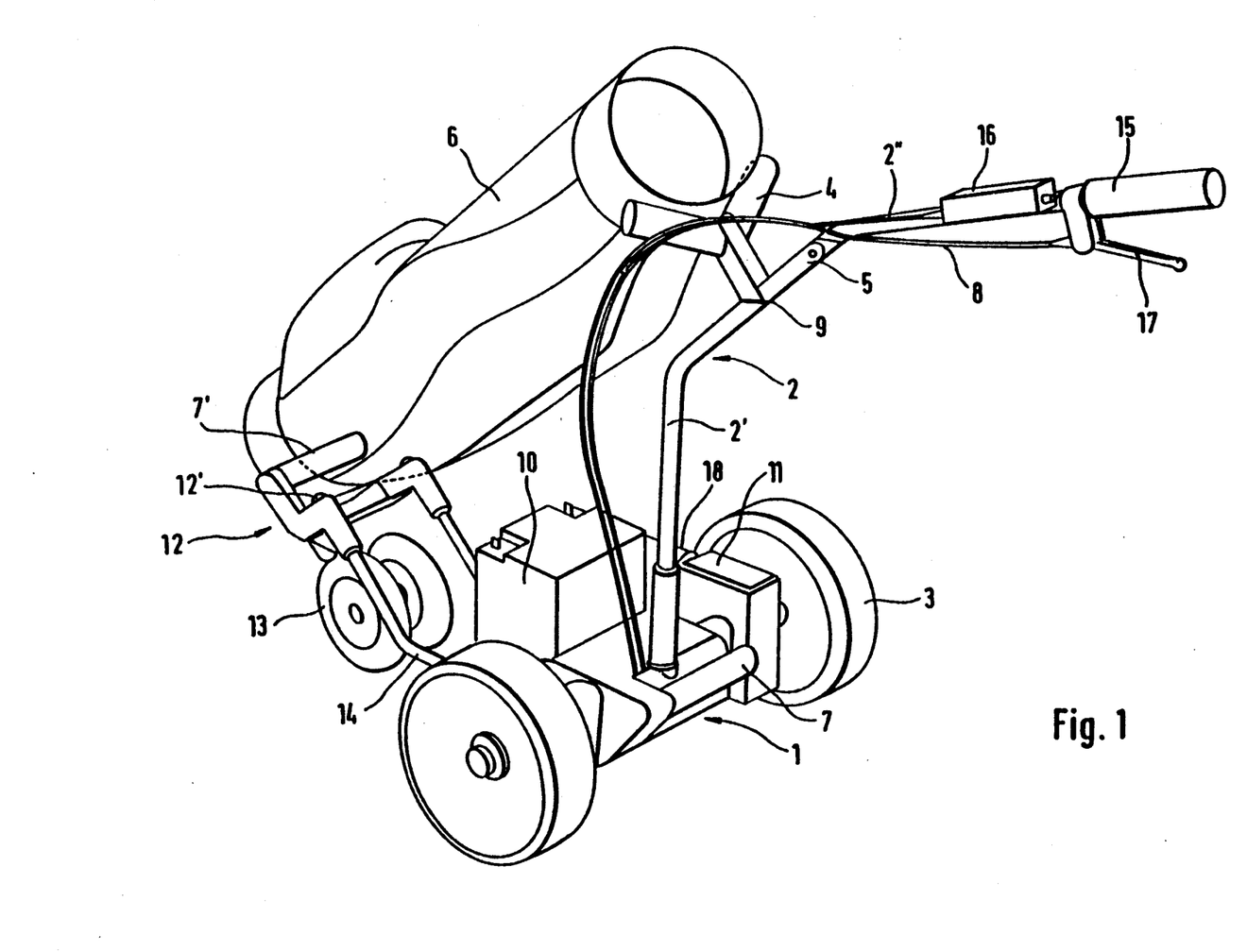

The caddie according to FIG. 1, includes a cart frame with a front frame part 12, and a rear frame part 1, which are connected to each other via two stable tie rods or braces 14.

The two frame parts 1, 12 are comprised of aluminum pressure die casting, while the tie rods or braces 14 are formed from steel pipes. Two rear wheels 3 are furnished at the rear frame part 1. The rear wheels 3 are driven by an electric motor 18 via a drive transmission 11. A front wheel 13 is supported at the front frame part 12. A rechargeable battery, for example, a dry battery, serves as an energy source and is disposed near the center of gravity of the cart frame.

In each case, carrying handles 7' or 7, respectively, are furnished in the front and in the rear at the two frame parts 12, 1. The handle parts of these carrying handles 7' or 7, respectively, are covered with a soft rubber material or a like upholstered material (softgrip). A steering arm 2 with a lower steering part 2' and an upper steering part 2" is disposed at the rear frame part 1 in front of the rear carrying handle 7'. The lower steering part 2' is, as can be recognized in FIG. 2, fixed at the rear frame part 1 by way of a folding hinge 20. The lower steering part 2' is fixed in its vertical position according to FIG. 2 during the assembly of the caddie. The upper half of the lower steering part 2' is inclined rearwardly opposite to the drive direction. The upper steering part 2" is similarly connected to the end of the lower steering part 2' via a folding hinge 5. The folding hinge 5 can be fixed in different angle positions of the two steering parts 2', 2" relative to each other. The height level of the steering arm 2 can be set to a convenient gripping level for the user based on the various angle positions of the two steering parts 2', 2" relative to each other.

Figure 2:
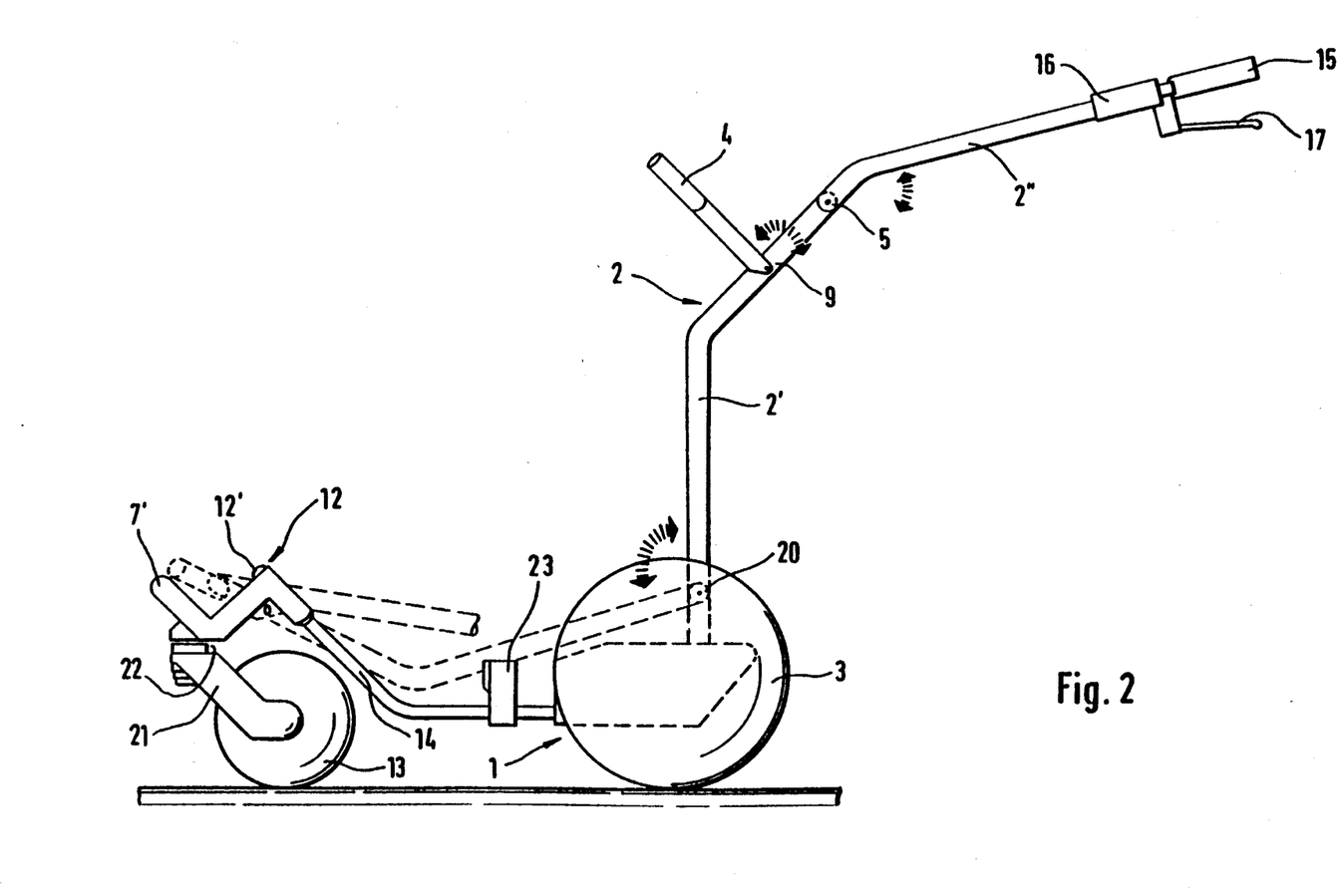

A handle grip 15 made of soft rubber together with a braking lever 17 for a Bowden cable brake is furnished at the upper end of the upper steering part 2", such as this is also usual, for example, with two-wheel vehicles. In addition, a switching member 16 is disposed in front of the handle grip 15 at the upper steering part 2". Said switching member 16 allows to set different cart drive speeds. According to an alternative way, not illustrated in the drawing, the switching member can also be combined with the handle grip, such that a speed control and regulation is possible by a turning of the handle grip. A Bowden cable 8 together with the electric connection cable for the switching member leads from the brake lever 17 downwardly to the rear frame part 1.

A brace with a retainer 4 is fixed at a further folding hinge 9 at the lower steering part 2' between the folding hinge 5 and the bending section of the steering part 2'. A golf bag 6 is attached in the upper region of the retainer 4, where the retainer 4 is bent like a V or like a U. The lower end of the golf bag 6 rests on the front frame part 12, whereby, the upholstered carrying handle 7', the rubber knobs 12' and the upholstered retainer 4 operate as shock absorbers.

Figure 5:
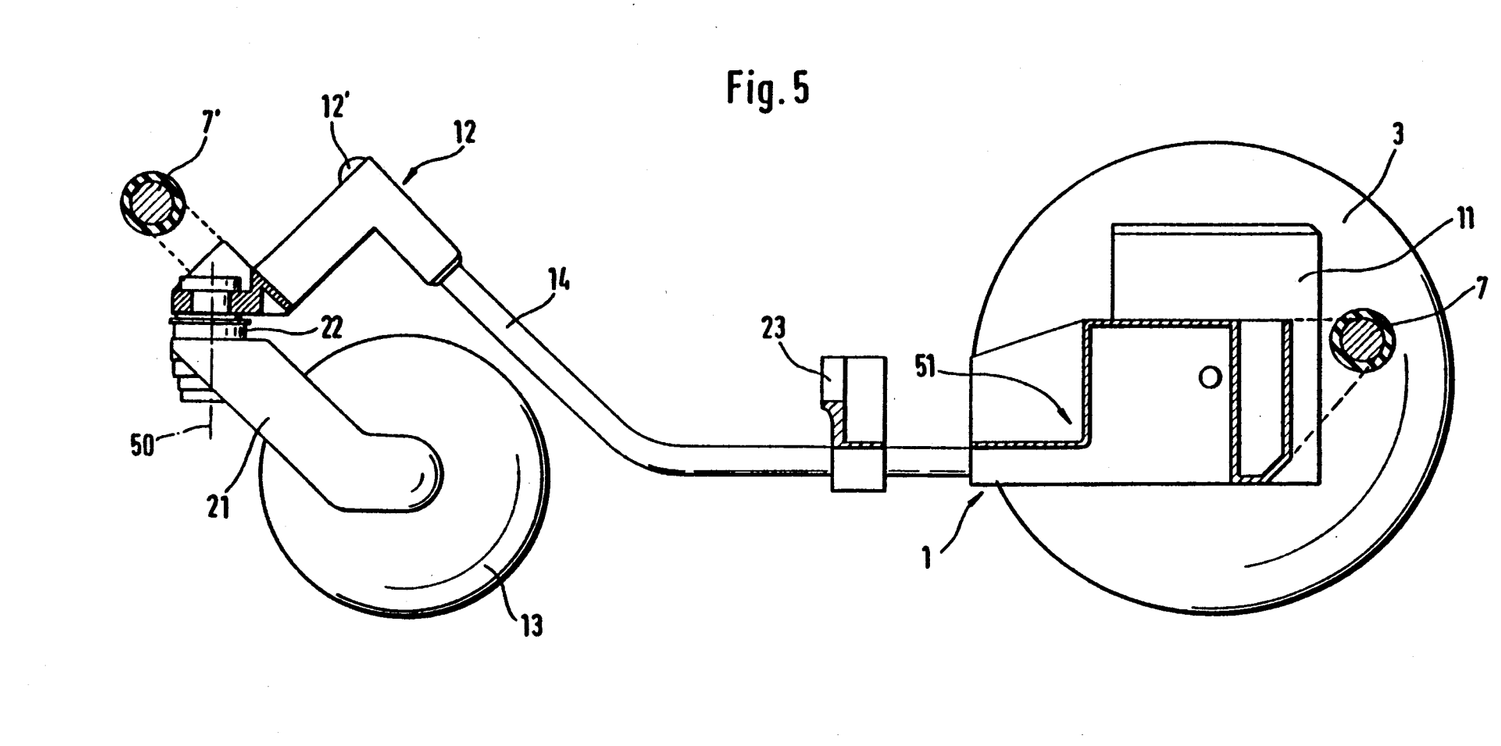

The braces 14 run horizontally in the rear region and are bent upwardly at an inclined angle in the front region, as can be recognised from FIG. 5.

Figure 4:
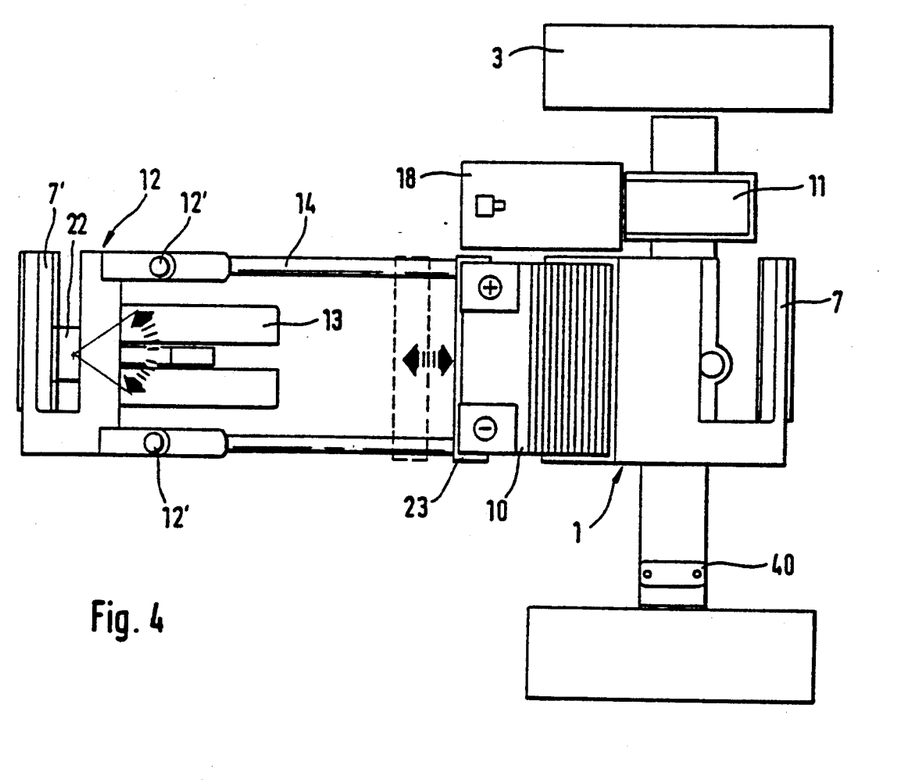

The two braces 14 end in an L-shaped protrusion, which is formed to the front frame part 12 such that the two arms are inclined downwardly. A pivot bearing 22 is furnished below the carrying handle 7', protruding at an angle upwardly, in the front region of the front frame part 12. A wheel fork 21 is rotatably supported on the pivot bearing 22. The wheel fork 21 is offset at an angle in rearward direction for improving the steering properties. The front wheel 13 is supported at the wheel fork 21, where the front wheel 13 is formed as a twin wheel, as illustrated in FIG. 4. The wheel fork 21 exhibits a backward bent section or caster, i.e. the rotation axis 50 of the rotary bearing is slightly inclined a driving direction relative to a vertical direction. A certain reset effect of the front wheel results thereby after the passage through curves.

A right-angled protrusion 51 is formed at the front end of the rear frame part 1. This protrusion serves for receiving the battery 10. Said battery 10 rests with its second end on a battery support 23 shiftable on the two braces 14. Since the battery support is shiftable, this allows the incorporation of batteries of different sizes, for example, a battery with 12 Volts and 36 Ah or 44 Ah.

Figure 6:
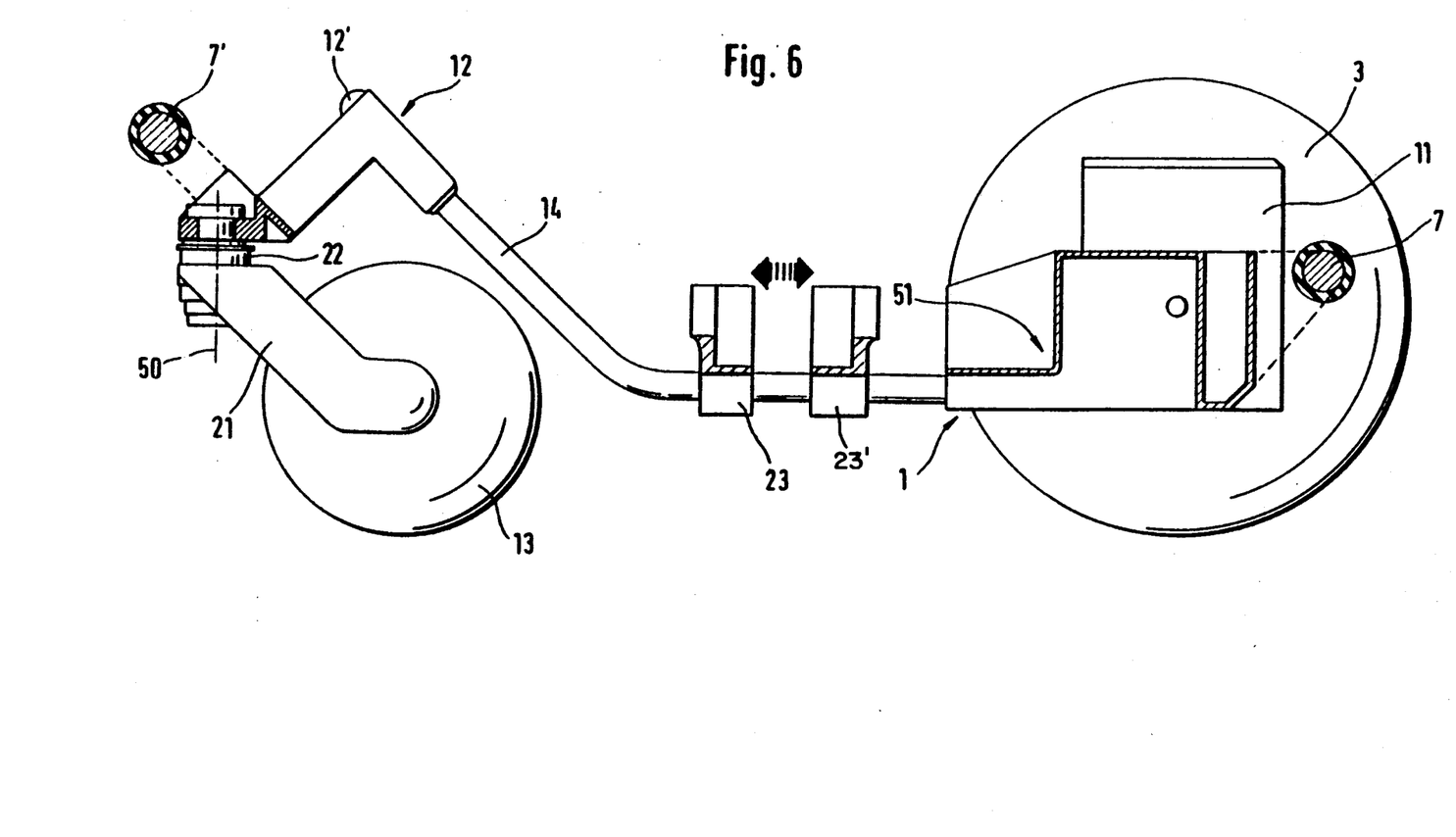

According to the embodiment of FIG. 6, a second shiftable support 23' can be furnished. The position of the battery, inserted into the two battery supports 23 and 23', relative to the caddie, and thereby the center of gravity can be shifted forward by a shifting of the two battery supports 23 and 23'. This is advantageous for the use of the caddie in connection with steep golf course sections and stretches.

Figure 3:
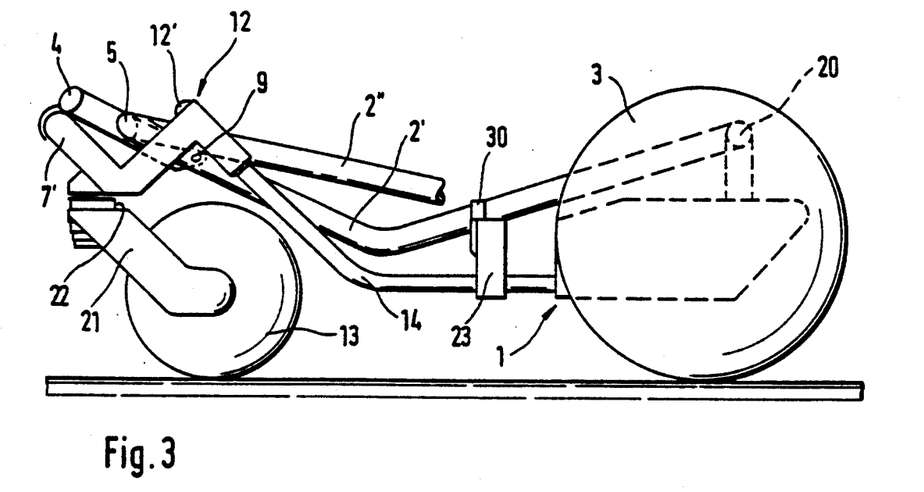

The caddie can be easily folded for transport, for example, in the trunk space of an automobile. According to FIG. 3, the lower steering part 2' can be folded forwardly and the upper steering part 2" can be folded rearwardly. Since the retainer 4 for the golf bag 6 can also be folded, the total frame structure can be folded on the cart frame in a space saving manner. A clamp 30 is formed at the battery support 23 for fixing the lower steering part 2' at the cart frame. Said clamp 30 can be lockingly engaged with the lower steering part 2'. The carrying handles 7, 7' facilitate the handling in the folded state.

The arrangement of the different elements of at the cart frame can be recognized from FIG. 4. Next to the battery, which is disposed at about the center of gravity of the cart frame at the front end of the rear frame part 1, there is provided the electric motor 18, and the drive transmission 11 is disposed behind the electric motor 18. In addition, a seat receiver 40 is furnished at the opposite side at the upper side of the rear frame part 1. A rest seat can be attached at the seat receiver 40 if this should be desired in exceptional cases.

Figure 7:
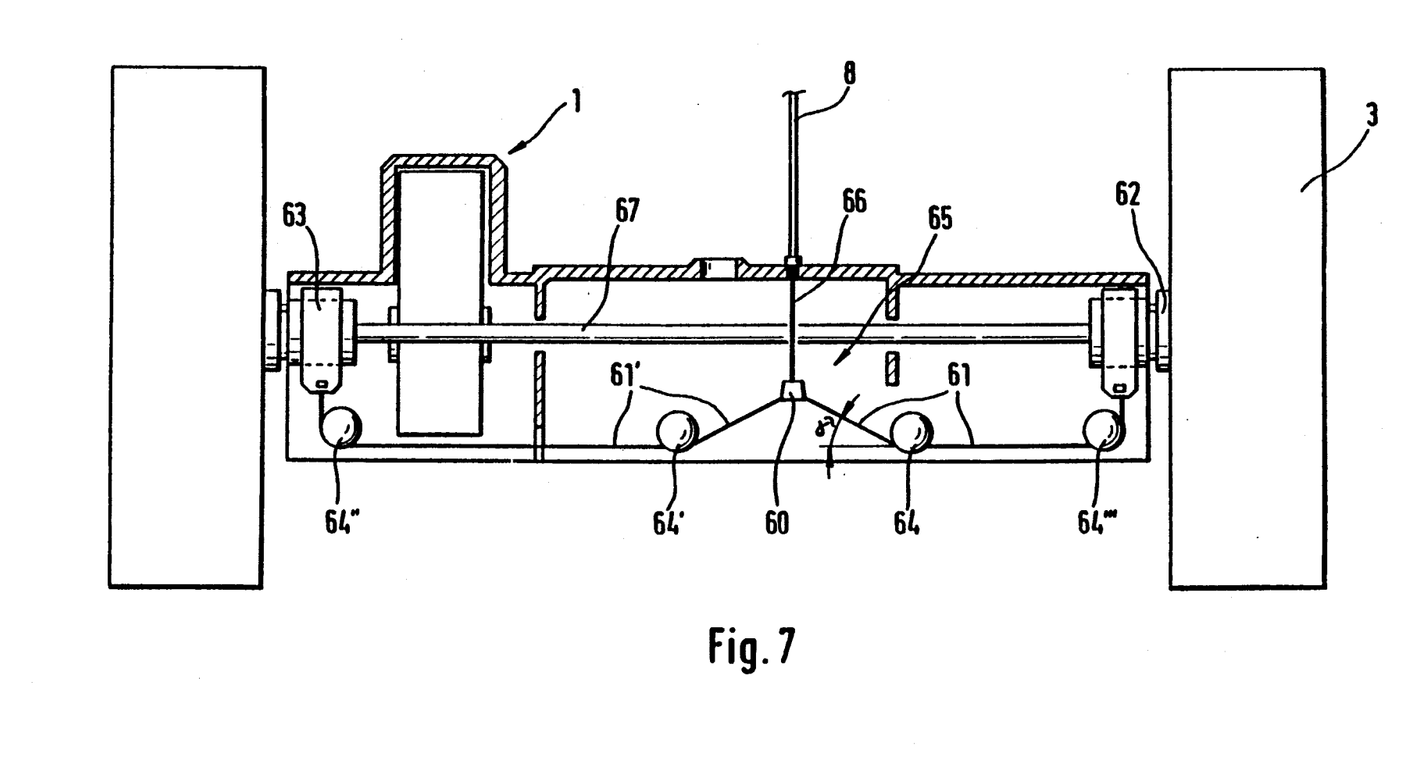

The two rear wheels 3 are supported according to FIG. 7 at a rigid rear axle 67 with wheel bearing supports 62. The braking device 65, formed as a Bowden cable for the rear wheels comprises essentially belt brakes 63 at each rear wheel 3. Said belt brakes can be actuated by way of the Bowden cable 8. The Bowden cable 8 is attached with its envelope casing at the rear frame part 1. The pull cable 66 of the Bowden cable 8 ends in a clamping collar 60, through which the brake pull cable is led for a simultaneous actuation of the two belt brakes 63 of the brake, and wherein the brake pull cable is deflected via deflection rollers and comprises pull cable sections 61 and 61'. Since the brake pull cable is shiftable relative to the clamping collar 60, the length of the pull cable sections 61, 61' adapts upon wear of the belt brakes 63. In case of non-uniform wear there result different pulling angles alpha for the pull cable section 61 or 61', respectively, which results in different pulling forces. This feature assures at all times a uniform braking.

Figure 8:
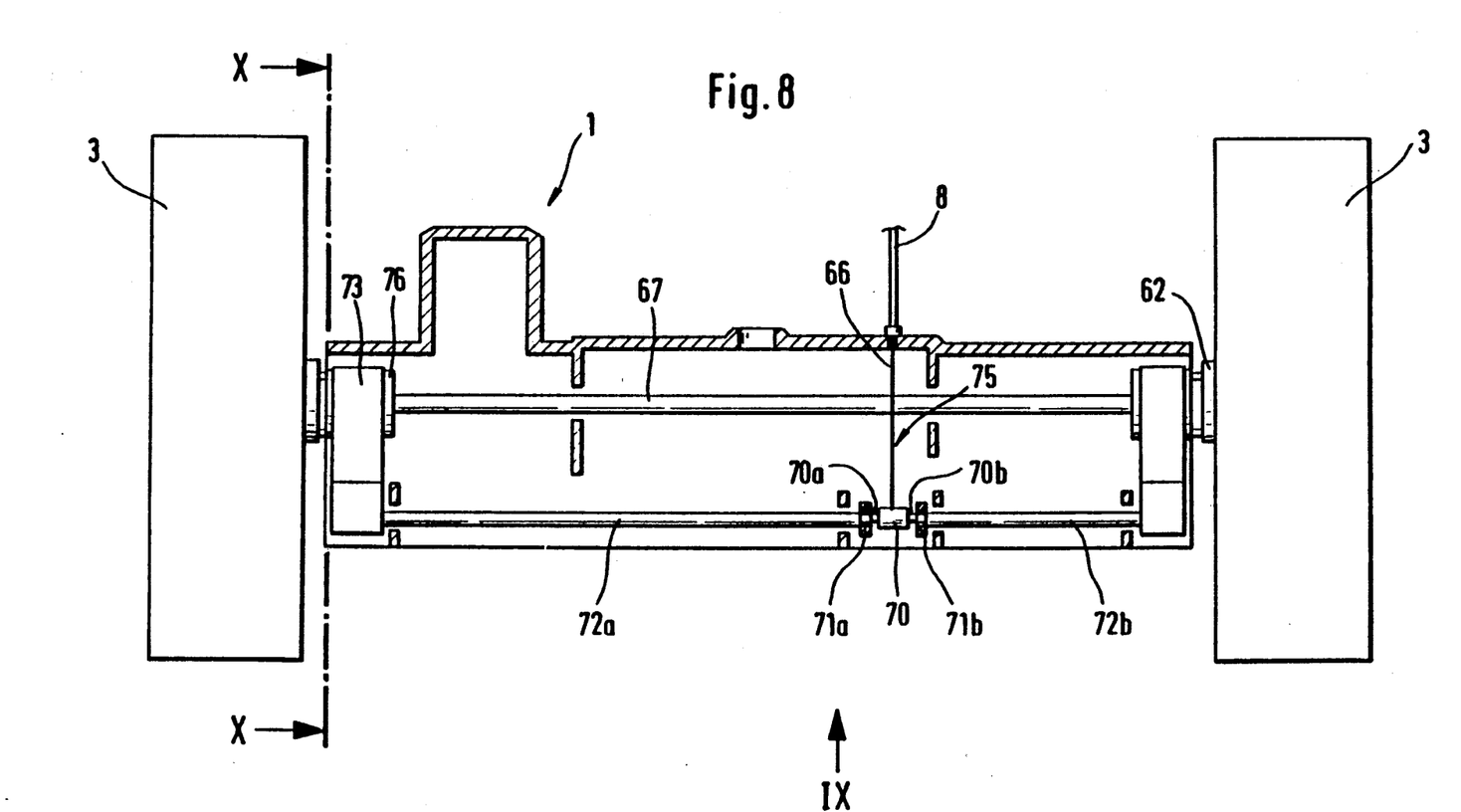
Figure 9:
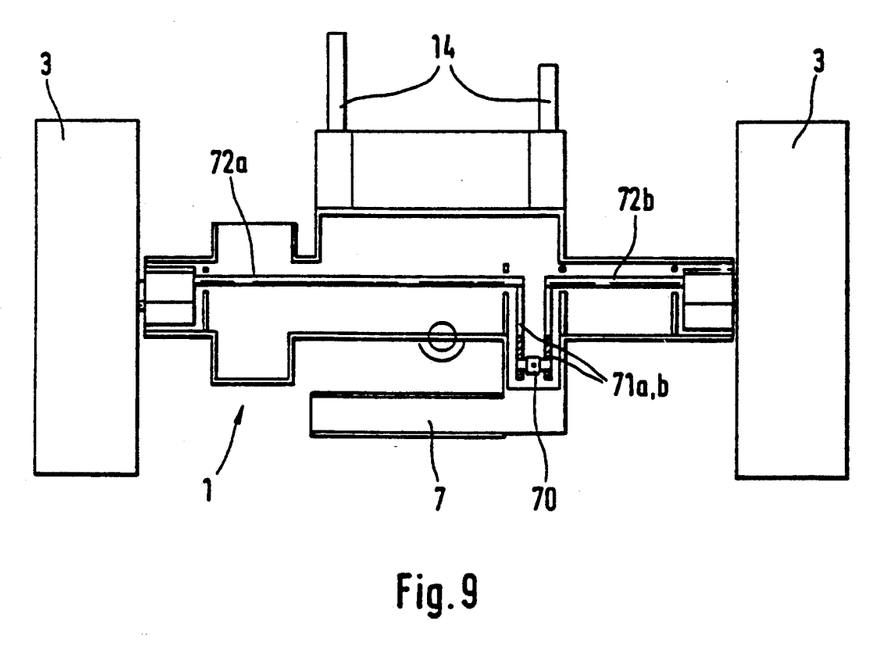
Figure 10:
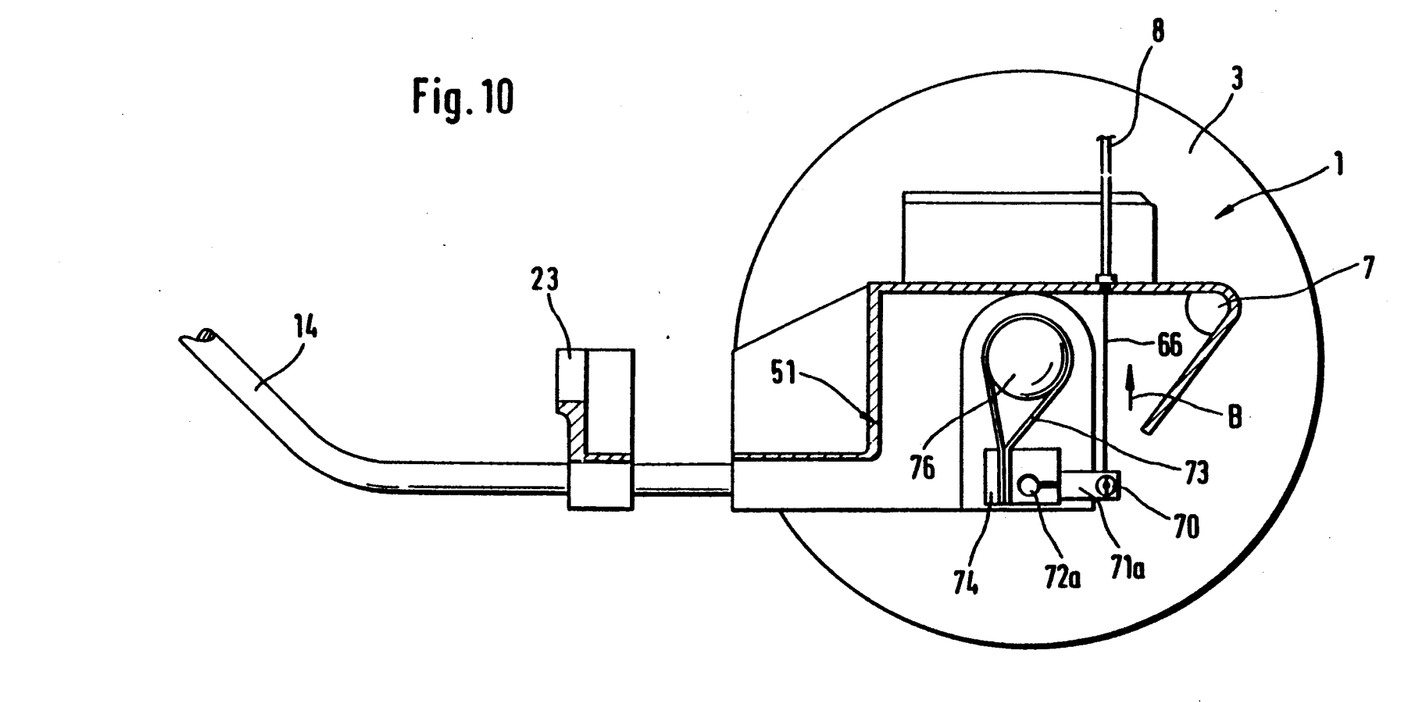

The second exemplified embodiment of the invention caddie, illustrated in FIGS. 8–10, includes a somewhat differently structured brake device 75. The same reference numerals are employed as far as the construction elements coincide with those of the first embodiment according to FIGS. 1–7. In this connection, reference is made to the preceding description. According to the second embodiment as well, the braking force acting on the rear wheels 3 is transferred by way of a Bowden cable 8 with a pull cable 66. The free end of the pull cable 66 is centrally connected to an axle section 70, which is rotatably supported between the lever arms 71a, b. The lever arms 71a, b are connected, fixed against rotation, with the two partial sections of the braking axle 72a, b. As can be recognized in particular in the side view of FIG. 10, a partial section of the brake axle 72a or b, respectively, is in each case solidly connected via a clamping element 74 to the ends of the brake belt 73. This brake belt 73 envelopes the brake drum 76, which in turn is connected, fixed against rotation, to the rear axle 67 and thus to the rear wheels 3. The actuation of the brake has the consequence that the pull cable 66 is pulled back in the direction of the cable B in FIG. 10 and thereby a rotary motion, in a counterclock direction according to FIG. 10, is transferred by way of the lever arms 71a, b onto the brake axle part sections 72a, b. This effects that a pulling force is transferred via the clamping elements 74 onto the brake belt 73, whereby the friction resistance between the brake belt 73 and the brake drum 76 is increased and thus the vehicle is braked.

For balancing the non-uniform brake wear, the brake axle partial sections 72a, b are rotatably supported, independent from each other, and are loosely coupled to each other only via the axle section 70 such that the lever arms 71a and 71b can assume an angled position relative to each other. This can be achieved, for example, by dimensioning the diameter of the cylindrical protrusions 70a, 70b of the axle section 70 smaller than the diameter of the boreholes at the lever arms 71a, b, receiving the protrusions.

The electric motor 18, the drive transmission 11, the control electronics for controlling the electric motor, as well as the brake device 65 and the rear axle 67 are surrounded by the rear frame part 1 such that these parts are protected against, soiling and damage or other environmental influences, respectively.

The control electronics exhibits a low discharge blockage, which interrupts the current supply upon reaching of a preset minimum voltage. This avoids damage to the battery based on a discharge of excessive current.

I claim:

1. A golf caddie, comprising frame means supported by a front wheel rotatably mounted at a wheel fork, and having a pair of rear wheels driven by an electrical drive unit with a brake device for said rear wheels attached to rear axles and actuatable by means of a brake lever disposed at a steering arm, said golf caddie further comprising a support for a golf bag;

said steering arm inclined rearwardly opposite to the drive direction, a brake lever connected to one end of an encased pull cable with the casing of said pull cable fixed at a rear frame and the other end of the pull cable being centrally connected to actuating means acting on belt brakes at said rear wheels, whereby said brakes are actuated simultaneously and with the same braking effect upon pulling of the pull cable by means of the brake lever; and wherein the electrical drive unit is powered by a chargeable battery attached at about the center of gravity of the frame means between said rear frame and a battery support and the battery support is adjustably supported on a pair of braces.

2. The golf caddie according to claim 1 wherein the drive unit includes an electric motor (18), a drive transmission (11) and control electronics, and the rear axle (67) is surrounded by a rear frame part (1).

3. The golf caddie according to claim 2, further including a front frame part.

4. The golf caddie according to claim 2 wherein a switching control member (16) for controlling an electric motor (18) driving said drive transmission is disposed adjacent the upper steering part (2").

5. The golf caddie according to claim 2 wherein said control electronics has a low discharge blocking circuit, and wherein the low discharge blocking circuit interrupts the current supply upon reaching of a predetermined minimum voltage of the battery (10).

6. The golf caddie according to claim 1, wherein said handle grip (15) with a brake lever (17) is disposed at the steering arm.

7. The golf caddie according to claim 1, wherein the pull cable is actuated via the brake lever (17) using a Bowden cable (8).

8. The golf caddie according to claim 1, wherein the steering arm includes a lower steering part (2') and an upper steering part (2"), and wherein the two steering parts (2', 2") are connected to each other via a lockable folding hinge (5), and the lower steering part (2') is fixed at the rear frame part (1) with a lockable folding hinge (20).

9. The golf caddie according to claim 8, wherein retainers are furnished for supporting the golf bag (6), and the retainers are fixed with a folding hinge (9) at a lower steering part (2').

10. The golf caddie according to claim 9 wherein carrying handles (7, 7') are furnished at a front frame part (12) and the rear frame part (1).

11. The golf caddie according to claim 10, wherein the carrying handle (7, 7') and the retainers (4) are furnished with coverings, and wherein the front frame part (12) is furnished with knobs (12') made of a shock-insulating material, and wherein the golf bag (6) rests on the knobs.

12. The golf caddie as claimed in claim 1, wherein the other end of said pull cable is connected to a clamping collar which in turn cooperates with further pull cables extending from said belt brakes via deflection rollers.

13. The golf caddie as claimed in claim 1, wherein the other end of the pull cable is connected to a rotary-movable axle section, cooperatively associated with lever means and brake means comprising brake belting about brake drums rotatably connected to the rear axle, whereby upon rotation of the brake means, an equal braking force is transmitted to each of the rear wheels.

14. The golf caddie as claimed in claim 13, wherein said brake means is a brake axle formed as a two piece element with each axle rotationally fixedly connected to a lever arm, and with the axles being coupled to each other via the rotary-movable axle section, such that for balancing of non-uniform brake wear the brake axels assume different rotaty angles upon actuation of the brake device lever.

* * * * *